ized environment US007562173B2

(12) United States Patent
De et al.

(10) Patent No.: US 7,562,173 B2
(45) Date of Patent: Jul. 14, 2009

(54) HANDLING SHARED INTERRUPTS IN BIOS UNDER A VIRTUALIZATION TECHNOLOGY ENVIRONMENT

(75) Inventors: Debkumar De, Lakewood, WA (US); Dror Shenkar, Haifa (IL); Nir Benty, Nehariya (IL); Victor Umansky, Haifa (IL)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 11/726,834

(22) Filed: Mar. 23, 2007

(65) Prior Publication Data

US 2008/0235426 A1 Sep. 25, 2008

(51) Int. Cl.
*G06F 13/24* (2006.01)
*G06F 13/32* (2006.01)
(52) U.S. Cl. .............................. 710/267; 710/261; 718/1
(58) Field of Classification Search ................. 710/261, 710/267
See application file for complete search history.

(56) References Cited

U.S. PATENT DOCUMENTS

| 4,975,836 | A | * | 12/1990 | Hirosawa et al. | ............. 718/100 |
| 7,149,832 | B2 | * | 12/2006 | Wieland et al. | ............. 710/269 |
| 7,231,512 | B2 | * | 6/2007 | Rothman et al. | ................ 713/1 |
| 2004/0117532 | A1 | * | 6/2004 | Bennett et al. | ............. 710/260 |
| 2004/0123086 | A1 | * | 6/2004 | Rothman et al. | ................ 713/1 |
| 2005/0080965 | A1 | * | 4/2005 | Bennett et al. | ............. 710/200 |
| 2007/0088890 | A1 | * | 4/2007 | Wieland et al. | ............. 710/269 |
| 2008/0141277 | A1 | * | 6/2008 | Traut et al. | .................. 719/313 |

* cited by examiner

*Primary Examiner*—Paul R Myers
*Assistant Examiner*—Ryan M Stiglic
(74) *Attorney, Agent, or Firm*—Trop, Pruner & Hu, P.C.

(57) ABSTRACT

A custom interrupt service routine may be developed to handle interrupt requests that would not be appropriately handled by either of two operating system guests in a virtualization technology (VT) environment. In some embodiments, the custom interrupt service routine does not in any way interfere with the operation of the interrupt handling in a non-VT environment.

13 Claims, 2 Drawing Sheets

HANDLING SHARED INTERRUPTS IN BIOS UNDER A VIRTUALIZATION TECHNOLOGY ENVIRONMENT

BACKGROUND

This relates to the operation of software under a virtualization technology (VT) environment.

In a VT environment, such as the Intel VT or AMD Pacifica, an infrastructure may be provided to execute applications in an isolated and protected partition, called the service partition, using the VT capability. The operating system that is visible to end users runs in another partition, called the user partition. For example, a firewall application running in service partition is forwarding the inspected/verified data packets to the user partition. A typical flow of a network packet consist of a) processing and inspection of the network packet by the firewall application in service partition, and b) subsequent forwarding of the network packet to the user partition through the inter-communication channel. The network packet eventually reaches the end-user application running in user partition (as it would happen in a non-VT environment).

In a particular VT environment, Windows CE can be used in the service partition and Windows XP in the user partition. The control flow of boot process can be summarized as follows: a) Basic input/output system passes the control to VT loader; b) VT loader loads itself and prepares the environments for the service partition and user partition for both guests Windows CE and Windows XP respectively; c) VT loader launches Windows CE in service partition, Windows CE completes its boot, and requests VT loader to launch Windows XP; d) VT loader then launches Windows XP and Windows XP starts booting.

During initial stages of a boot process, the XP operating system uses different basic input/output system services as usual. However, the XP operating system is unaware that it is running within a partition isolated and supervised by another entity. Although the control flow of the XP operating system in the VT aware environment remains identical to that of the non-VT environment, the underlying hardware environment differs as far as the device ownership is concerned.

Typically, devices are fully owned by one operating system or guest running in a particular partition (service partition or user partition), and, therefore, are isolated from one another. For example, network controllers may be owned by the Windows CE operating system running in service partition, that handles all incoming and outgoing packets, while storage devices, like hard disks, may be owned by the XP operating system running in user partition. However, some devices, like programmable interrupt controller, may be shared between the two operating systems and are thereby exposed to both guests via the underlying software models.

When an interrupt request is shared by different devices, owned by different guests, in level-triggered interrupt environments, the interrupt may be conveyed to both guests under the assumption that the service routine of both guests will be invoked; the service routine of a particular guest will check the interrupt source for the device it controls; if several devices raise a shared interrupt request simultaneously, all devices will be checked as possible interrupt sources and serviced as necessary; and if a guest detects that the interrupt source for the device it controls, it will service the interrupt or, otherwise, it will ignore the interrupt by sending an end of interrupt.

The basic input/output system (BIOS) installs a default interrupt request handler for all hardware interrupts. If no other entity installs a handler for a particular interrupt request, the basic input/output system default interrupt service routine remains as the only active interrupt handler for the concerned interrupt request. In a shared interrupt environment, when an entity installs a handler for a particular interrupt request, the concerned handler is installed in a chained fashion so that the last installed handler gets control first on the occurrence of the concerned interrupt request and the basic input/output system default interrupt service routine remains at the bottom of the interrupt handler chain. Thus, if no handler claims and services the generated interrupt request, the basic input/output system default interrupt service routine eventually gets control and finds the interrupt request that has been generated, but not claimed and, hence, not serviced by anybody, and disables the request, treating it like a spurious interrupt.

DETAILED DESCRIPTION

Some virtualization technology (VT) capabilities may expect that an interrupt request will be ignored if no owner is found, while the basic input/output system (BIOS) expects that the interrupt request will be disabled if no owner is found. The conflicting requirements regarding the handling of a shared interrupt request gives rise to a situation where the interrupt request may be disabled by the basic input/output system default interrupt service routine if no owner claims it. For example, where an interrupt request is shared by a network controller and a hard disk controller, if the interrupt is generated by the network controller in the virtualized environment when one operating system Windows XP is booting up in the user partition, the interrupt is injected into both operating system guests.

In an environment where one operating system Windows XP is booting in the user partition, the interrupt handlers that are installed by the basic input/output system (or other entities) is invoked. However, the installed interrupt handlers for the hard disk may not service the interrupt because it is not generated by a hard disk operation, but, instead, is generated by a network operation. Even though the other operating system guest Windows CE running in service partition installs a network driver and processes the interrupt as expected, no entity may install the interrupt handler for the network controller during the boot process of the operating system in the user partition. Hence, the basic input/output system default interrupt service routine is invoked as the last entry in the chained interrupt handlers, disabling the interrupt request which may subsequently result in an error while accessing the hard disk and possibly in the failure to boot the system.

This situation may be overcome by installing on demand a custom interrupt service routine. The BIOS may be requested to install the custom interrupt handler as required, allowing the basic input/output system default interrupt service routine to remain unchanged, while allowing installation of a custom interrupt service routine for a particular interrupt request as needed.

Thus, a custom interrupt service routine may be active only for a concerned shared interrupt request between two guests and existing basic input/output system default interrupt service routines will be active for all other interrupt requests. In a non-VT environment, the existing basic input/output system default interrupt service routine remains active for all interrupts as usual. This allows development of a single basic input/output system that works in both VT and non-VT environments, while maintaining the compatibility with all existing environments.

Figure 1:
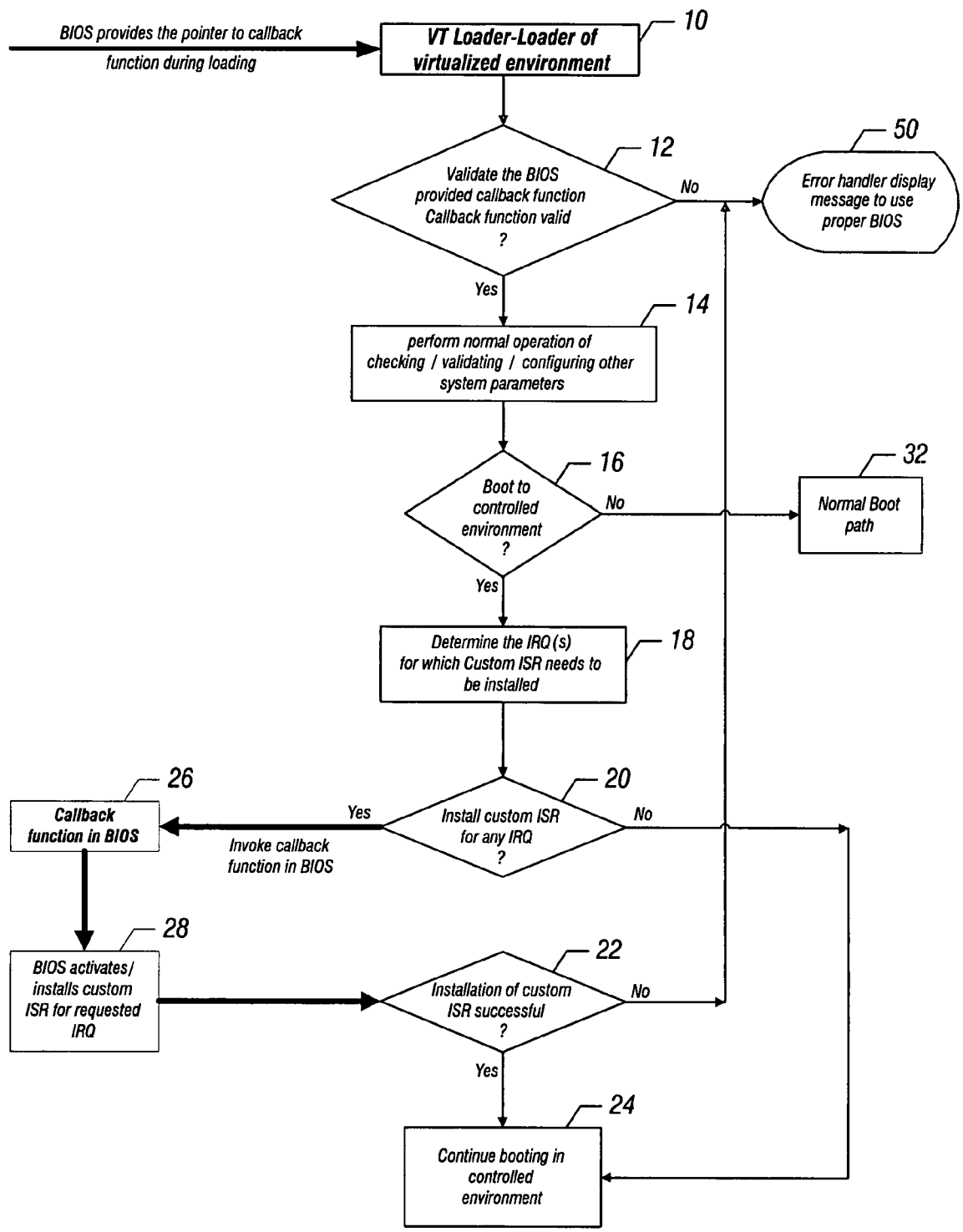
FIG. 1 is a flow chart for one embodiment of the present invention including a call back function to install/activate a custom interrupt service routine.

The invocation of a callback method by VT loader is illustrated in FIG. 1. The callback function 26 may be implemented in the basic input/output system in one embodiment. The basic input/output system may also implement the custom interrupt service routine that does not disable the interrupt request if no owner is found, but just issues an end of interrupt and keep the custom interrupt service routine inactive and make it active only when asked by the caller (e.g. VT loader). The basic input/output system may provide the pointer to the callback function when the basic input/output system passes the control to the VT loader (loader of VT environment), as indicated by the arrow adjacent to block 10 in FIG. 1.

Then in diamond 12, the loader validates the basic input/output system provided callback function. If the function is not valid, an error message may be displayed, as indicated at 50. Otherwise, the loader performs the normal operation of checking and validating and configuring other system parameters as indicated in block 14.

A check at diamond 16 determines whether the boot is to a controlled environment. If not, the normal boot path is followed as indicated in block 32. Otherwise, the loader determines the interrupt request for which a custom interrupt service routine needs to be installed, as indicated in block 18. A check at diamond 20 determines whether to install custom interrupt routines to service any interrupt requests. If so, the callback function is invoked by the loader, as indicated in block 26.

The loader thus uses a callback function to install and activate the custom interrupt service routine, as indicated in block 28, for a particular interrupt request during the boot process. A check at diamond 22 determines whether the custom interrupt service routine installation was successful. If so, booting continues in the controlled environment, as indicated in block 24.

Figure 2:
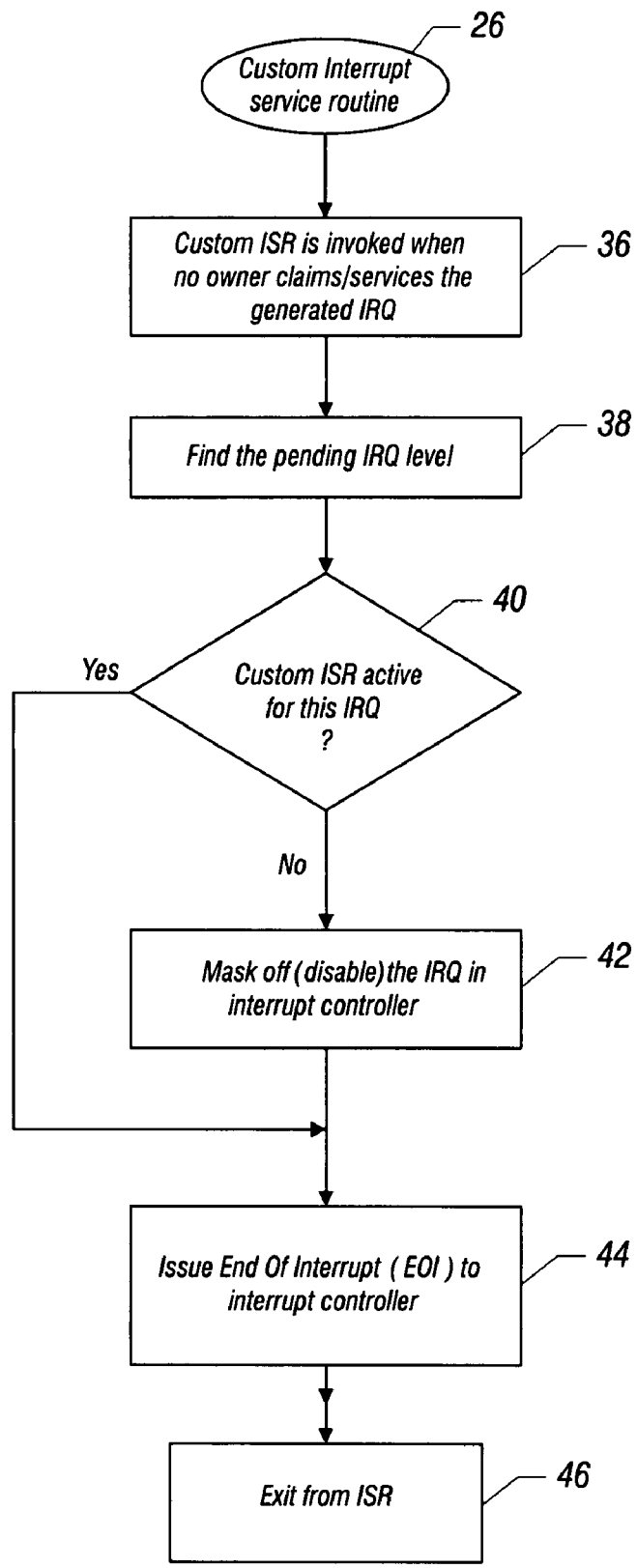
FIG. 2 is flow chart for the custom interrupt service routine in accordance with one embodiment of the present invention.

The custom interrupt service routine operates, as indicated in FIG. 2, in accordance with one embodiment. The custom interrupt service routine is invoked when no owner claims or services the generated interrupt request, as indicated in block 36. The pending interrupt request level is then identified, as indicated in block 38. If the custom interrupt service routine is active for the request, as determined in diamond 40, an end of interrupt is issued to the interrupt controller, as indicated in block 44. Then there is an exit from the interrupt service routine.

If the custom interrupt service routine is not active, the interrupt request is masked off and disabled in their interrupt controller, as indicated in block 42. Then an end of interrupt is issued to the interrupt controller, as indicated in block 44 and there is an exit from the interrupt service routine.

When active, the interrupt service routine finds the unclaimed interrupt request and whether the custom interrupt service routine has been activated for the unclaimed request. If the custom interrupt service routine has been activated for the unclaimed request, it issues an end of interrupt without disabling the interrupt request, as indicated in FIG. 2, block 44. The loader can also optionally uninstall a custom interrupt service routine when the boot process is complete. The loader may supply a new custom interrupt service routine or use a built-in custom interrupt service routine in the basic input/output system.

In some embodiments, the use of a custom interrupt service routine makes the basic input/output system compatible with various environments, including both VT and non-VT environments. A custom interrupt service routine may be installed on demand and may be installed for one or more interrupt requests. It may also be uninstalled in some embodiments.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining, using a loader, when an interrupt request may not be handled by either of at least two guests in a virtualization technology environment; and
   installing, using a basic input/output system, a custom interrupt service routine for that interrupt request.

2. The method of claim 1 including determining whether an interrupt request may not be handled includes storing instructions to determine whether an interrupt request may not be handled during booting.

3. The method of claim 1 including using a callback routine to implement the custom interrupt service routine.

4. The method of claim 3 including enabling the basic input/output system to pass control to a loader.

5. The method of claim 4 including enabling the loader to utilize a callback function to install/activate the custom interrupt service routine.

6. The method of claim 5 including enabling the interrupt service routine to find an unclaimed interrupt request and issue an end of interrupt without disabling the interrupt request.

7. The method of claim 6 including enabling a loader to uninstall the custom interrupt service routine when the boot process is complete.

8. An apparatus comprising:
   a loader to determine when an interrupt request may not be handled by either of at least two guests in a virtualization technology environment; and
   a basic input/output system including a callback function to install a custom interrupt service routine for that interrupt request.

9. The apparatus of claim 8 wherein said loader to determine whether an interrupt request may not be handled by determining whether an interrupt request may not be handled during booting.

10. The apparatus of claim 8 wherein said callback routine to implement a custom interrupt service routine.

11. The apparatus of claim 10 wherein said loader to utilize said callback function to install/activate a custom interrupt service routine.

12. The apparatus of claim 11 wherein said interrupt service routine to find an unclaimed interrupt request and issue an end of interrupt without disabling the request.

13. The apparatus of claim 11 wherein said loader to uninstall the custom interrupt service routine when the boot process is complete.

* * * * *